United States Patent
Kumagai et al.

(10) Patent No.: US 7,861,423 B2
(45) Date of Patent: Jan. 4, 2011

(54) SURVEYING INSTRUMENT, SURVEYING SYSTEM, METHOD FOR DETECTING MEASURED OBJECT, AND COMPUTER-READABLE RECORDING MEDIUM FOR DETECTING MEASURED OBJECT

(75) Inventors: Kaoru Kumagai, Tokyo (JP); Fumihiko Kamizono, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 105 days.

(21) Appl. No.: 12/405,625

(22) Filed: Mar. 17, 2009

(65) Prior Publication Data
US 2009/0235541 A1    Sep. 24, 2009

(30) Foreign Application Priority Data
Mar. 21, 2008    (JP)    ............................. 2008-073826

(51) Int. Cl.
*G01C 15/00*    (2006.01)
(52) U.S. Cl. .......................................... 33/281; 33/290
(58) Field of Classification Search .................. 33/276, 33/278, 281, 282, 285, 290, 291
See application file for complete search history.

(56) References Cited

U.S. PATENT DOCUMENTS

| | | | | |
|---|---|---|---|---|
| 5,689,330 | A * | 11/1997 | Gerard et al. ................. | 33/291 |
| 7,228,635 | B2 * | 6/2007 | Jian et al. ..................... | 33/291 |
| 7,360,314 | B2 * | 4/2008 | Haijima et al. ................ | 33/290 |
| 2009/0119060 | A1 * | 5/2009 | Simburger et al. .......... | 702/150 |
| 2010/0088908 | A1 * | 4/2010 | Matzker et al. ............... | 33/282 |
| 2010/0186243 | A1 * | 7/2010 | Schumacher ................. | 33/290 |

FOREIGN PATENT DOCUMENTS

| EP | 1 061 335 A2 | 12/2000 |
|---|---|---|
| JP | 8-178652 A | 7/1996 |

* cited by examiner

*Primary Examiner*—G. Bradley Bennett
(74) *Attorney, Agent, or Firm*—Brinks Hofer Gilson & Lione

(57) ABSTRACT

A surveying instrument for measuring three-dimensional position of a measured object, has a detecting section for detecting a direction of the measured object by rotational emission of two or more fan-shaped laser beams in which at least one beam is inclined; an optical system including a tracking-light-emitting section for emitting a tracking light and a distance-measuring-light-emitting section for emitting a distance-measuring light; a tracking-light-receiving section for receiving the tracking light reflected by the measured object; and a driving section for driving the optical system in order to collimate the measured object according to an output of the detecting section and an output of the tracking-light-receiving section.

11 Claims, 8 Drawing Sheets

SURVEYING INSTRUMENT, SURVEYING SYSTEM, METHOD FOR DETECTING MEASURED OBJECT, AND COMPUTER-READABLE RECORDING MEDIUM FOR DETECTING MEASURED OBJECT

RELATED APPLICATIONS

This application claims priority under 35 U.S.C. §119 to Japanese Patent Application No. JP2008-073826 filed on Mar. 21, 2008, the entire content of which is hereby incorporated by reference.

BACKGROUND OF THE INVENTION

1. Field of the Invention

The present invention relates to a surveying instrument which measures a distance and an angle to a measured object by tracking a reflector provided at the measured object, and in particular, relates to a surveying instrument which can shorten a search time of the measured object.

2. Description of the Related Art

In the past, surveying work was carried out by using a surveying instrument provided at a control point, and by using a reflector (corner cube, etc.) of a measured object in which a surveying instrument collimates (setting of the optical axis of the telescope in the direction of the measured object). The surveying instrument has a horizontal-angle-measuring unit and a vertical-angle-measuring unit which detect a collimating direction, and a laser rangefinder that measures a distance from the surveying instrument to a collimated target. In recent years, the surveying instrument has an auto-tracking function for tracking the reflector automatically (collimated target) of the measured object, so a surveyor can take measurements alone.

In such a surveying instrument, a surveyor exists in the collimated target side, and moves the collimated target according to a work schedule. When the surveyor moves the collimated target, the surveying instrument tracks the collimated target and collimates the collimated target automatically.

The auto-tracking function of the surveying instrument is achieved by a driving section for driving a tracking-light-emitting section around a horizontal axis and a vertical axis, a tracking-light-emitting section for emitting a parallel tracking light to the reflector of the collimated target, and a tracking-light-receiving section for receiving a tracking light reflected by the reflector. When the driving section is controlled and a tracking light is located at the center of a light-detecting element in the tracking-light-receiving section, the surveying instrument can track the collimated target.

A trackable range is limited to a collimating range of a telescope section of the surveying instrument. Therefore, when the move speed of the collimated target moved by the surveyor is faster than the trackable speed of the surveying instrument, or when the collimated target is outside in the collimatable range, the surveying instrument loses sight of the collimated target and cannot track it. In this case, the surveying instrument searches the collimated target by rotating around a horizontal axis and a vertical axis. For example, Japanese Unexamined Patent Application Publication No. 2000-356518 discloses an invention relating to such a surveying instrument.

Furthermore, for example, Japanese Unexamined Patent Application Publication No. 8-178652 discloses the following invention. In this invention, a surveying instrument and a measured object receive positional information by GPS receiver, and the surveying instrument receives position information of the measured object by wireless, and then the surveying instrument searches a collimated target by position information of itself and position information of the measured object.

SUMMARY OF THE INVENTION

In the surveying instrument shown in Japanese Unexamined Patent Application Publication No. 2000-356518, when the surveying instrument searches for the measured object, the surveying instrument must rotate all around a horizontal axis and a vertical axis in order to change the collimating direction, because the collimating range is limited. The collimating range is narrower than the search area. Therefore, even if a direction of the measured object is known, time for catching the measured object is required, so efficiency of work is inferior.

In addition, a system using a GPS receiver for determining the position of a measured object is suggested in Japanese Unexamined Patent Application Publication No. 8-178652. However this system is unsuitable for indoor work, such as in a tunnel, subway, or forest. Therefore, rapid searches for the measured object cannot be anticipated.

In consideration of such circumstances, in a surveying instrument which measures a distance and an angle to the measured object by tracking a reflector of the measured object, an object of the present invention is to provide a technique for shortens the search time of the measured object.

The present invention is a surveying instrument for measuring three-dimensional position of a measured object, comprising: a detecting section for detecting a direction of the measured object by rotational emission of two or more fan-shaped laser beams in which at least one beam is inclined; an optical system including a tracking-light-emitting section for emitting a tracking light and a distance-measuring-light-emitting section for emitting a distance-measuring light; a tracking-light-receiving section for receiving the tracking light reflected by the measured object; and a driving section for driving the optical system in order to collimate the measured object according to an output of the detecting section and an output of the tracking-light-receiving section.

According to the present invention, the search time of the measured object can be shortened, because the search area of the measured object is wide. The surveying instrument collimates approximately by this fan-shaped laser beams, and the surveying instrument collimates precisely by the tracking light.

A second aspect of the present invention is a surveying system including a surveying instrument for measuring the three-dimensional position of a measured object, comprising: a detecting section for detecting a direction of the measured object by rotational emission of two or more fan-shaped laser beams in which at least one beam is inclined; an optical system including a tracking-light-emitting section for emitting a tracking light and a distance-measuring-light-emitting section for emitting a distance-measuring light; a tracking-light-receiving section for receiving the tracking light reflected by the measured object; and a driving section for driving the optical system in order to collimate the measured object according to an output of the detecting section and an output of the tracking-light-receiving section. According to the second aspect, the surveying system can obtain the above-mentioned effect by the composition in which the surveying instrument and the measured object collaborate.

In a third aspect of the present invention, the measured object is a target having a reflector, the detecting section has a fan-shaped-laser-beam-receiving section for receiving the fan-shaped laser beams reflected by the reflector, and the direction of the measured object is detected based on a rotating position of the beam emission and receiving signals of the fan-shaped-laser-beam-receiving section. According to the third aspect, the measured object can be composed of only the reflector.

In a fourth aspect of the present invention, the measured object is a target having a fan-shaped-laser-beam-receiving section, and the detecting section has a wireless communication section for communicating by the wireless between the surveying instrument and the measured object, and a calculating section for calculating a direction of the measured object according to the direction of the beam emission of the fan-shaped laser beams in a horizontal plane and according to the receiving signals of the fan-shaped-laser-beam-receiving section obtained by the wireless communication section. According to the fourth aspect, the measured object can receive the fan-shaped laser beams.

In a fifth aspect of the present invention, the calculating section is provided at the measured object. According to the fifth aspect, the measured object can calculate the direction of the measured object.

In a sixth aspect of the present invention, the calculating section is provided at the surveying instrument. According to the sixth aspect, the surveying instrument can calculate the direction of the measured object.

In a seventh aspect of the present invention, the rotational emission of the fan-shaped laser beams is carried out by a fan-shaped-laser-beam-emitting section, and the fan-shaped-laser-beam-emitting section and the optical system rotates around the same vertical axis. According to the seventh aspect, a horizontal angle of the fan-shaped-laser-beam-emitting section and a horizontal angle of the optical system are detected by the same vertical axis.

In a eighth aspect of the present invention, the fan-shaped-laser-beam-emitting section can rotate in a vertical plane, and when the detecting section cannot detect a direction of target, the direction of the beam emission in a vertical plane is changed. According to the eighth aspect, even if the measured object does not exist in the search area of the fan-shaped laser beams, the measured object can be searched for.

In a ninth aspect of the present invention, when the driving section drives the optical system according to the output of the detecting section and the collimating by the output of the tracking-light-receiving section is not possible, the driving section drives the optical system in a vertical direction. According to the ninth aspect, when the measured object can be searched for by the fan-shaped laser beams, even if the measured object does not exist in the collimating range of a tracking light, the measured object can be collimated.

A tenth aspect of the present invention is a method for detecting a measured object by a surveying instrument which measures a three-dimensional position of the measured object, comprising: a first step for detecting a direction of the measured object by the rotational emission of two or more fan-shaped laser beams in which at least one beam is inclined; a second step for driving an optical system including a tracking-light-emitting section and a distance-measuring-light-emitting section in the direction of the measured object according to an output of the first step; a third step for driving the driving section according to relative position between an optical axis in the fan-shaped-laser-beam-emitting section and an optical axis in the optical system, when a tracking light is emitted in a direction of the measured object and a tracking-light-receiving section cannot receive the tracking light reflected by the measured object; and a fourth step for emitting the tracking light in a direction of the measured object, for receiving the tracking light reflected at the measured object by the tracking-light-receiving section, and for driving the driving section. According to the tenth aspect, when the measured object can be searched for by the fan-shaped laser beams, even if the measured object does not exist in the collimating range of the tracking light, the measured object can be collimated by driving the driving section according to relative position between an optical axis in the fan-shaped-laser-beam-emitting section and an optical axis in the optical system.

A eleventh aspect of the present invention is a computer-readable recording medium for detecting a measured object by a surveying instrument which measures a three-dimensional position of the measured object, comprising: a first step for detecting a direction of the measured object by rotational emission of two or more fan-shaped laser beams in which at least one beam is inclined; a second step for driving an optical system including a tracking-light-emitting section and a distance-measuring-light-emitting section in the direction of the measured object according to an output of the first step; a third step for driving the driving section according to relative position between an optical axis in the fan-shaped-laser-beam-emitting section and an optical axis in the optical system, when a tracking light is emitted in a direction of the measured object and a tracking-light-receiving section cannot receive the tracking light reflected by the measured object; and a fourth step for emitting the tracking light in the direction of the measured object, for receiving the tracking light reflected at the measured object by the tracking-light-receiving section, and for driving the driving section. According to the eleventh aspect, when the measured object can be searched for by the fan-shaped laser beams, even if the measured object does not exist in the collimating range of the tracking light, the measured object can be collimated by driving the driving section according to relative position between an optical axis in the fan-shaped-laser-beam-emitting section and an optical axis in the optical system.

According to the present invention, the surveying instrument, which measures a distance and an angle to the measured object by tracking a reflector of the measured object, can shorten the search time for the measured object.

DETAILED DESCRIPTION OF THE PREFERRED EMBODIMENTS

1. First Embodiment

An example of a surveying instrument and a surveying system comprising a fan-shaped-laser-beam-emitting section will be described hereinafter.

Composition of Surveying System

Figure 1:
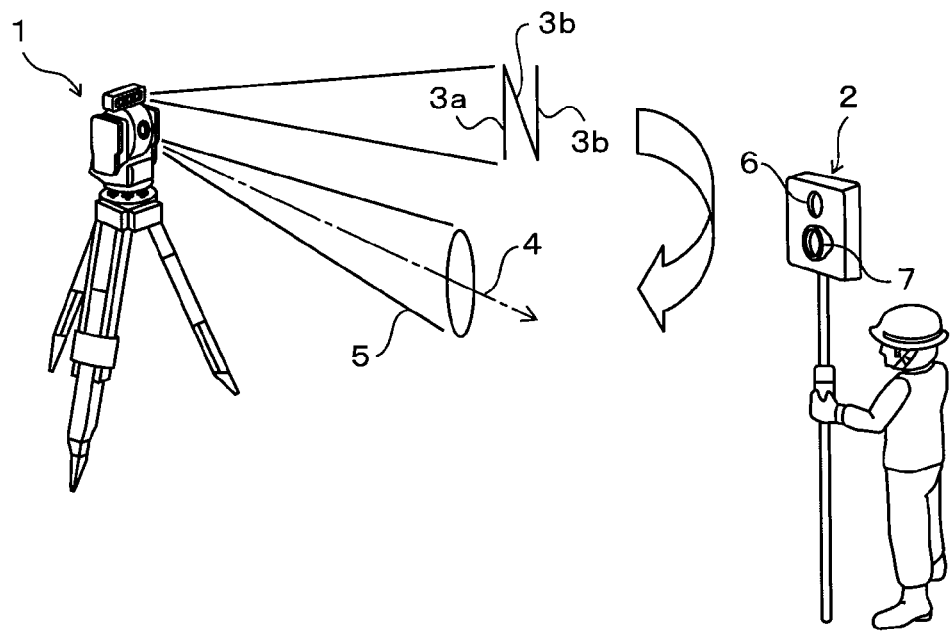
FIG. 1 is a diagram showing an example of composition of a surveying system.

FIG. 1 is a diagram showing an example of a composition of a surveying system. The surveying system is composed of a surveying instrument 1 and a measured object 2. As shown in FIG. 1, the surveying instrument 1 detects a direction of the measured object 2 by rotational emission to all azimuths of two or more fan-shaped laser beams 3a, 3b, and 3c (N-shaped light) in which at least one beam is inclined. In addition, after the surveying instrument 1 has detected the measured object 2, the surveying instrument 1 catches and tracks the measured object 2 by emitting a tracking light 4, which is parallel light. When the measured object 2 is in the collimating center, the surveying instrument 1 measures a distance by emitting a distance-measuring light 5, and measures an angle by using an angle-detecting section such as an encoder.

In the measured object 2, a fan-shaped-laser-beam-receiving section 6 receives the fan-shaped laser beams 3a, 3b, and 3c which were emitted by the surveying instrument 1. The measured object 2 calculates an elevation angle between an output position of the fan-shaped laser beams 3a, 3b, and 3c in the surveying instrument 1 and receiving position of the fan-shaped laser beams 3a, 3b, and 3c at the measured object 2. The measured object 2 sends an elevation angle and a receiving time to the surveying instrument 1. The surveying instrument 1 detects a direction of the measured object 2 from the elevation angle and the receiving time. In addition, the measured object 2 has a corner cube 7, which is a reflector reflecting the tracking light 4 and the distance-measuring light 5.

In the above-mentioned case, the timing of the surveying instrument 1 and the measured object 2 are synchronized. In the case in which the time of the surveying instrument 1 and the measured object 2 are not synchronized, when the measured object 2 receives the fan-shaped laser beams 3a, 3b, and 3c, the measured object 2 sends only receiving notification to the surveying instrument 1. The surveying instrument 1 detects a horizontal angle of the receiving time. Then, the measured object 2 calculates an elevation angle and can send the elevation angle to the surveying instrument 1. Furthermore, it is possible to use a method that is described in Japanese Patent Application No. 2007-152842 by the present applicant.

Composition of Surveying Instrument and Measured Object

Figure 2:
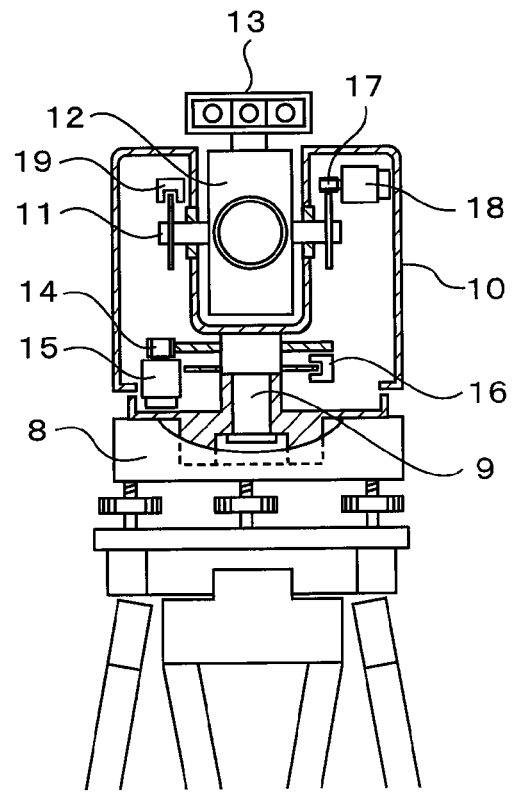
FIG. 2 is a diagram showing an example of a surveying instrument.

FIG. 2 is a diagram showing an example of a surveying instrument. The surveying instrument 1 has a substrate section 8 which is provided on a tripod, a main body 10 which is supported rotatably around a vertical axis 9 on the substrate section 8, a mirror cylinder 12 which is supported rotatably around a horizontal axis 11 on the main body 10, and a fan-shaped-laser-beam-emitting section 13 which is provided on the mirror cylinder 12.

The main body 10 has a horizontal rotary mechanism that horizontally rotates the mirror cylinder 12 and the fan-shaped-laser-beam-emitting section 13 around the vertical axis 9. The main body 10 is rotated by a horizontal rotary motor 15 via a horizontal rotary gear 14. In addition, the vertical axis 9 has a horizontal angle encoder 16, and the horizontal angle encoder 16 detects a horizontal angle.

The mirror cylinder 12 has a vertical rotary mechanism that vertically rotates the mirror cylinder 12 around the horizontal axis 11. The mirror cylinder 12 rotates by a vertical rotary motor 18 via a vertical rotary gear 17. In addition, the horizontal axis 11 has a vertical angle encoder 19, and the vertical angle encoder 16 detects a vertical angle. When the surveying instrument 1 tracked the measured object 2 in the collimation center, measurement of an angle to the measured object 2 is carried out. That is, the horizontal angle encoder 16 detects a horizontal angle and the vertical angle encoder 16 detects a vertical angle.

Figure 3A:
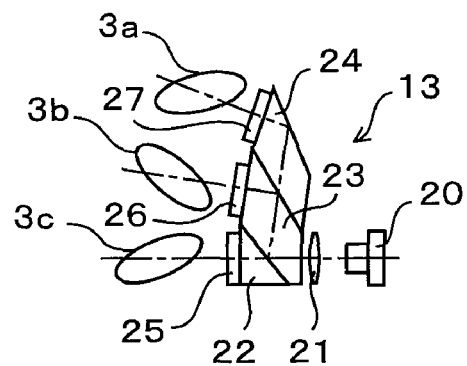
FIG. 3A is an arrangement diagram showing an optical system of a fan-shaped-laser-beam-emitting section.
Figure 3B:
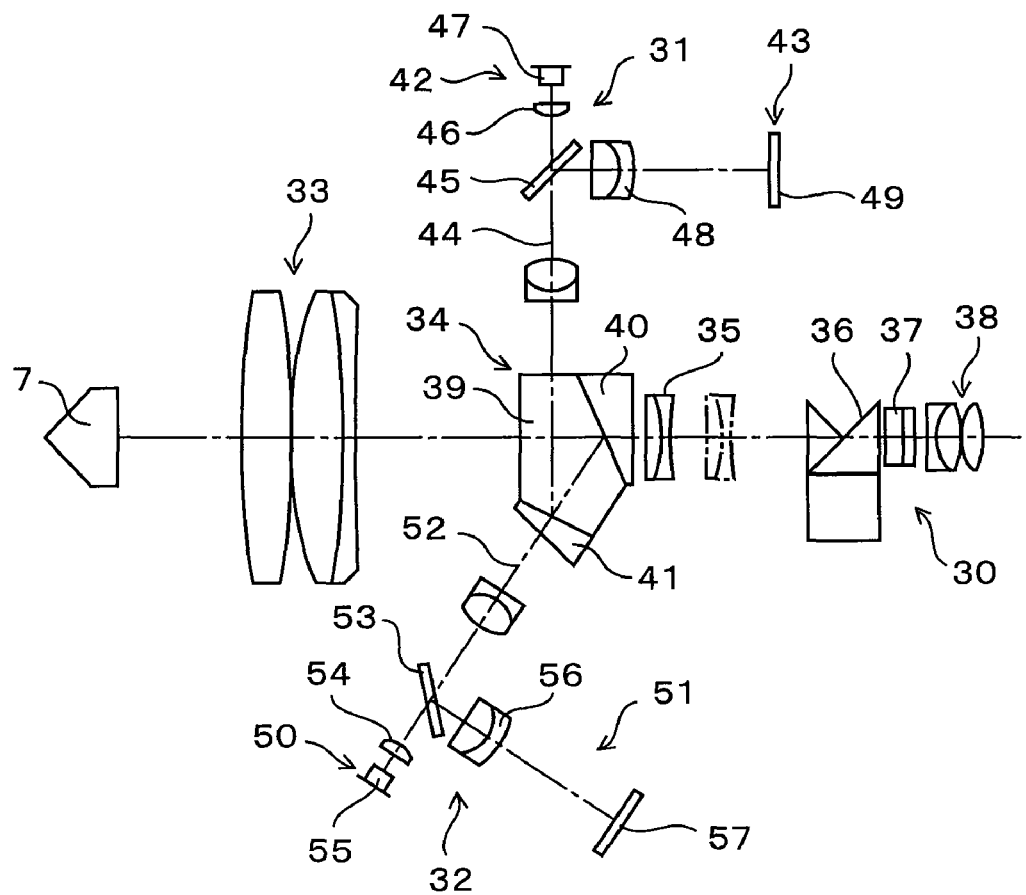
FIG. 3B is an arrangement diagram showing an optical system in a mirror cylinder section.

Next, an optical system of the fan-shaped-laser-beam-emitting section 13 and an optical system in the mirror cylinder 12 will be described hereinafter. FIG. 3A is an arrangement diagram showing an optical system of a fan-shaped-laser-beam-emitting section, and FIG. 3B is an arrangement diagram showing an optical system in a mirror cylinder section.

The fan-shaped-laser-beam-emitting section 13 has a fan-shaped laser light source 20, a relay lens 21, division prisms 22, 23, and 24, and cylindrical lenses 25, 26, and 27. The laser light which is output from the fan-shaped laser light source 20, is made to be parallel light by the relay lens 21, and is divided into three beams of laser lights by the division prisms 22, 23, and 24. The two beams of laser light 3a and 3c are output from both sides, and are expanded in a vertical direction by cylindrical lenses 25 and 27. In addition, the laser light 3b is output from the center of the three beams of laser light, and is expanded in a direction inclined from the vertical direction by cylindrical lens 26. The fan-shaped laser beams 3a, 3b, and 3c are received in the fan-shaped-laser-beam-receiving section 6 of the measured object 2.

The optical system in the mirror cylinder 12 has a telescope section 30 which is used for the collimation, a tracking optical system 31, and a distance-measuring optical system 32. An objective lens 33, a dichroic prism 34, a focusing lens 35, an erecting prism 36, a focusing mirror 37, and an eyepiece 38 are provided on an optical axis of the telescope section 30 one by one. The dichroic prism 34 is composed of a prism 39, a prism 40, and a prism 41. The prism 39, the prism 40, and the prism 41 form a first face and a second face that are dichroic mirror faces.

The first face passes a visible light and reflects an infrared light among an incident light from the objective lens 33. On the other hand, the second face passes the distance-measuring light 5 (infrared light) and reflects a tracking light 4 (infrared light). For example, the first face passes a visible light of 400 to 650 nm and reflects an infrared light of 650 to 850 nm. Furthermore, for example, the second face reflects an infrared light of 650 to 720 nm (tracking light 4) and passes an infrared light of 720 to 850 nm (distance-measuring light 5). The visible light, which enters from the objective lens 33 and passes the first face, forms an image in the focus mirror 37 by the focus lens 35, and is collimated. The distance-measuring optical system 32 is provided on an optical axis of light reflected by the first face, and the tracking optical system 31 is provided on an optical axis of light reflected by the second face.

The tracking optical system 31 has a tracking-light-emitting section 42 and a tracking-light-receiving section 43. The tracking-light-emitting section 42 is composed of an aperture mirror 45 provided on an optical axis 44 of the tracking light, and of a relay lens 46 provided on an optical axis of light passing an aperture mirror 45, and of a laser light source 47 used for tracking the measured object. The tracking-light-receiving section 43 is composed of a relay lens 48 provided on an optical axis of light reflected by an aperture mirror 45, and of a light-detecting element 49. The tracking light 4, which is output from the laser light source 47 for tracking, passes the aperture mirror 45, and is reflected by the first face and the second face, and is output from the objective lens 33. The tracking light 4, which is output from the objective lens 33, is reflected by the corner cube 7 in the measured object 2, and enters the objective lens 33, and is reflected by the first face, the second face, and the aperture mirror 45, and is received in the tracking-light-receiving section 43.

The distance-measuring optical system 32 has a distance-measuring-light-emitting section 50 and a distance-measuring-light-receiving section 51. The distance-measuring-light-emitting section 50 is composed of an aperture mirror 53 provided on an optical axis 52 of the distance-measuring light 5, and of a relay lens 54 provided on an optical axis of light passing an aperture mirror 53, and of a laser light source 55 for measuring a distance. The distance-measuring-light-receiving section 51 is composed of a relay lens 56 provided on an optical axis of light reflected by an aperture mirror 53, and of a light-detecting element 57. The distance-measuring light 5, which is output from the laser light source 55 for the distance-measuring light 5, passes an aperture mirror 53 and the second face, and is reflected by the first face, and is output from the objective lens 33. The distance-measuring light 5, which is output from the objective lens 33, is reflected by the corner cube 7 in the measured object 2, and enter the objective lens 33, and is reflected by the first face, and passes the second face, and is received by the distance-measuring-light-receiving section 51.

The optical path of the tracking light 4 and the optical path of the distance-measuring light 5 can be different. Furthermore, the optical system of the fan-shaped-laser-beam-emitting section 13 and the optical system in the mirror cylinder 12 including the tracking optical system 31 and the distance-measuring optical system 32 can be provided in the same case and can share the horizontal angle encoder and the vertical angle encoder.

Figure 4:
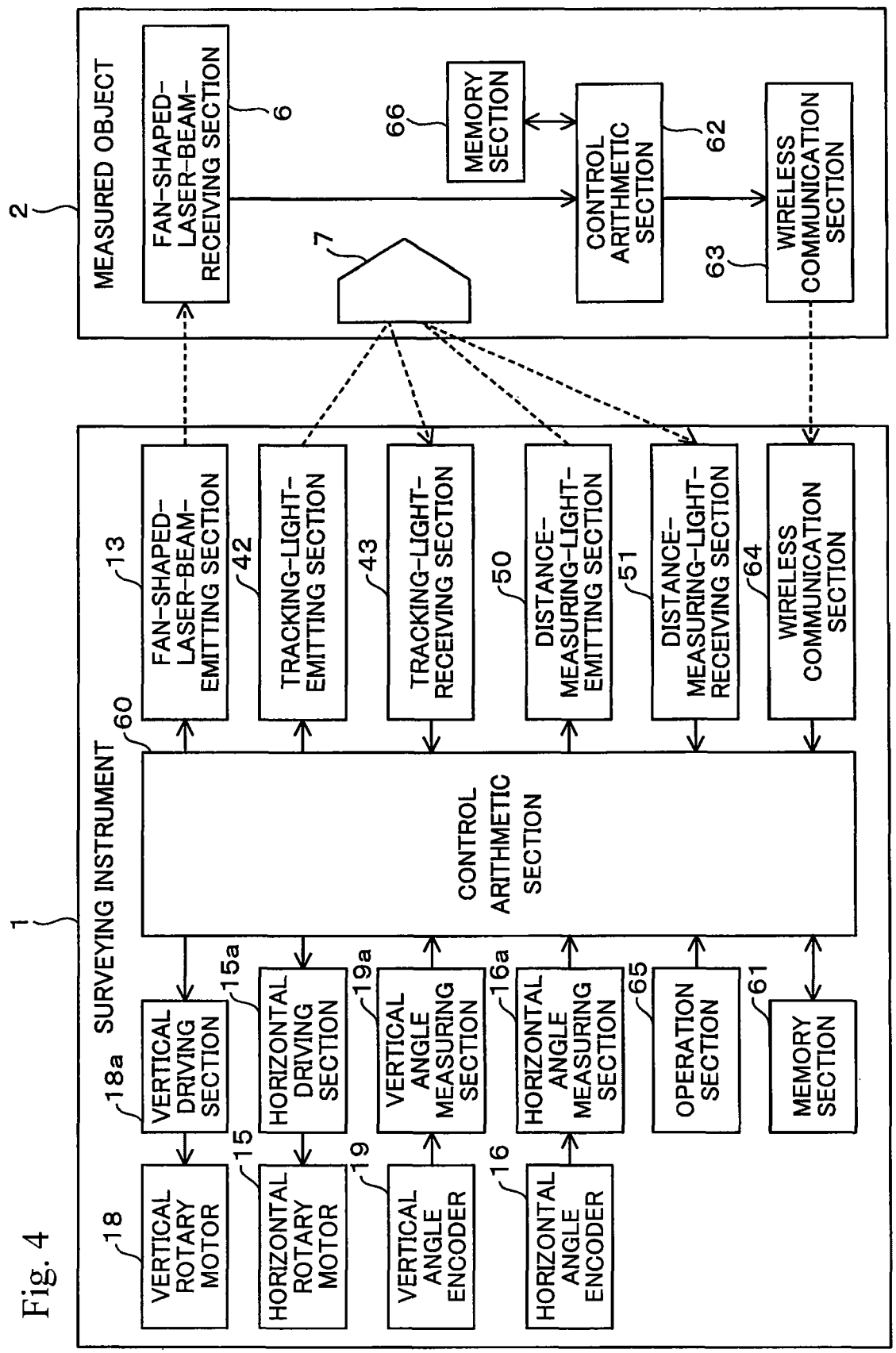
FIG. 4 is a block diagram of a surveying instrument and a measured object in a first embodiment.

A block diagram of the surveying instrument 1 and the measured object 2 will be described hereinafter. FIG. 4 is a block diagram of a surveying instrument and a measured object in the first embodiment. The surveying instrument 1 is operated by an operation section 65. A control arithmetic section 60 of the surveying instrument 1 drives a horizontal rotary motor 15, and horizontally rotates the main body 10 of the surveying instrument 1, and emits the fan-shaped laser beams 3a, 3b, and 3c from the fan-shaped-laser-beam-emitting section 13. At this time, the surveying instrument 1 detects a horizontal angle by a horizontal angle encoder 16 in a predetermined time interval, and stores this in a memory section 61. In addition, at this time, the surveying instrument 1 does not output the tracking light 4 and the distance-measuring light 5 in order to decrease power consumption.

Furthermore, the surveying instrument 1 can detect the measured object 2 by driving the fan-shaped-laser-beam-emitting section 13 in the direction of an elevation angle while rotating in a horizontal plane, even if the measured object 2 exists outside of an emission range of the fan-shaped laser beams 3a, 3b, and 3c. In this case, a searching range of the fan-shaped laser beams 3a, 3b, and 3c is wide, so the surveying instrument 1 can collimate the measured object 2 quickly in comparison with the case in which the present invention is not applied.

The measured object 2 receives the fan-shaped laser beams 3a, 3b, and 3c by the fan-shaped-laser-beam-receiving section 6. The fan-shaped-laser-beam-receiving section 6 and the corner cube 7 in the measured object 2 are provided on the same vertical line, and the fan-shaped-laser-beam-emitting section 13 and a collimating position of the telescope section 30 in the surveying instrument 1 are also provided on the same vertical axis 9. Therefore, a positional offset between the fan-shaped-laser-beam-receiving section 6 and the corner cube 7 in the measured object 2 is corresponding to a positional offset between the fan-shaped-laser-beam-emitting section 13 and a collimating position of the telescope section 30 in the surveying instrument 1. Therefore, there is no angle offset between an elevation angle detected by the fan-shaped laser beams 3a, 3b, and 3c and a vertical angle in an actual collimating position.

On the other hand, the fan-shaped-laser-beam-emitting section 13 and the optical system including the tracking optical system 31 and the distance-measuring optical system 32 rotate around the same vertical axis 9 in a horizontal plane. The emitting direction of the fan-shaped laser beams 3a, 3b, and 3c and the outputting direction of the tracking-light 4 and the distance-measuring light 5 are also the same. Therefore, there is no angle offset between a horizontal angle detected by the fan-shaped laser beams 3a, 3b, and 3c and a horizontal angle in an actual collimating position.

A control arithmetic section 62 of the measured object 2 calculates an elevation angle between the surveying instrument 1 and the measured object 2 from light signals of the fan-shaped laser beams 3a, 3b, and 3c. The elevation angle and the receiving time of light signals are stored in a memory section 66. The calculated elevation angle and the receiving time of light signals are sent to the surveying instrument 1 by a wireless communication section 63. The surveying instrument 1 receives an elevation angle and the receiving time from a wireless communication section 64. In addition, the measured object 2 does not calculate the elevation angle, and can send only the receiving time to the surveying instrument 1, and the surveying instrument 1 can calculate an elevation angle and a horizontal angle. Furthermore, the measured object 2 sends only receiving-notification to the surveying instrument 1, and then calculates an elevation angle, and can send the elevation angle to the surveying instrument 1.

Figure 5A:
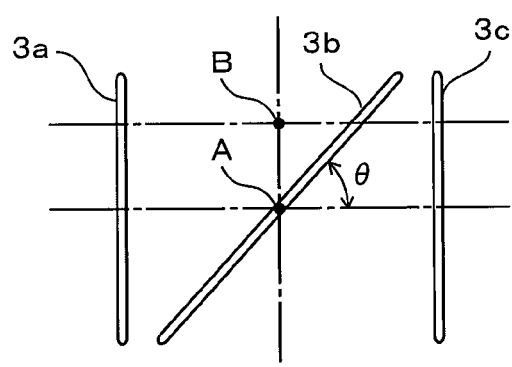
FIG. 5A to FIG. 5D are explanatory diagrams of a method for calculating an elevation angle by the fan-shaped laser beams.
Figure 5B:
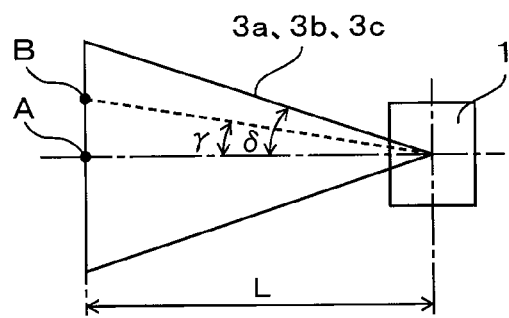
Figure 5C:
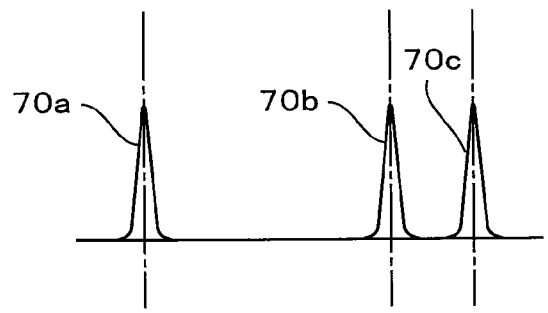
Figure 5D:
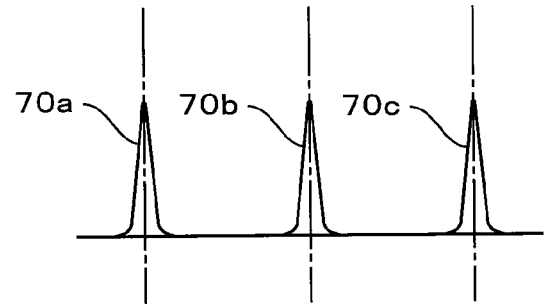

FIG. 5A to FIG. 5D are explanatory diagrams of a method for calculating an elevation angle by the fan-shaped laser beams. FIG. 5A is an elevation view of the fan-shaped laser beams, FIG. 5B is a side view of the fan-shaped laser beams, FIG. 5C is a diagram of light signals in a case in which the fan-shaped-laser-beam-receiving section is at a position of B point, FIG. 5D is a diagram of light signals in a case in which the fan-shaped-laser-beam-receiving section is at a position of the A point.

As shown in FIG. 5A, when the fan-shaped-laser-beam-receiving section 6 is at a position of the B point, that is, when the fan-shaped-laser-beam-receiving section 6 shifts from the center of the fan-shaped laser beams 3a, 3b, and 3c, as shown in FIG. 5C, time interval of light signals 70a and 70b and time intervals of light signals 70b and 70c are different. As shown in FIG. 5A, when the fan-shaped-laser-beam-receiving section 6 is at the position of the A point, that is, when the fan-shaped-laser-beam-receiving section 6 is at the center of the fan-shaped laser beams 3a, 3b, and 3c, as shown in FIG. 5D, time intervals of light signals 70a and 70b and time intervals of light signals 70b and 70c are equal. Therefore, the elevation angle γ can be calculated from a ratio of the time intervals between light signals 70a, 70b and light signals 70b, 70c, an inclined angle θ of the fan-shaped laser beam 3b, and an enlarged angle δ of the fan-shaped laser beams 3a, 3b, and 3c.

The control arithmetic section 62 of the measured object 2 judges that an unnecessary reflector exists and excludes this light signals, when time intervals of light signals of the fan-shaped laser beams 3a, 3b, and 3c is abnormal, for example, when the receiving times of the fan-shaped laser beams 3a and 3c are not fixed, or when the number of light signals within a certain period is abnormal. Furthermore, the control arithmetic section 62 of the measured object 2 adjusts the light-receiving sensitivity of the fan-shaped-laser-beam-receiving section 6, and excludes the existence of an unnecessary reflector by strength of the light signal.

In FIG. 4, when the wireless communication section 64 of the surveying instrument 1 receives the elevation angle and the receiving time, the control arithmetic section 60 of the surveying instrument 1 calculates the horizontal angle to the measured object 2 by using a time interpolation method based on both the receiving time and the horizontal angle detected in a predetermined time interval. The control arithmetic section 60 of the surveying instrument 1 drives the vertical rotary motor 18 only by the elevation angle received from the measured object 2, and drives the horizontal rotary motor 15 only by the horizontal angle calculated by using the time interpolation method. As a result, the collimating position is adjusted in a direction of the measured object 2.

After the collimation is finished, the control arithmetic section 60 of the surveying instrument 1 emits the tracking light 4 from the tracking-light-emitting section 42, and catches the measured object 2. The tracking light 4 is received at the tracking-light-receiving section 43. When the measured object 2 is in the collimating center, the distance-measuring-light-emitting section 50 emits the distance-measuring light 5. Then, measurement of a distance and an angle is carried out. The control arithmetic section 60 of the surveying instrument 1 calculates a distance between the surveying instrument 1 and the measured object 2 according to the speed of light and the transit time from the output time of the distance-measuring light 5 to the receiving time of the distance-measuring light 5 reflected by the corner cube 7 of the measured object 2. In addition, the control arithmetic section 60 of the surveying instrument 1 calculates the horizontal angle and the vertical angle by the horizontal angle encoder 16 and the vertical angle encoder 17, when the distance-measuring light 5 is output. Furthermore, for example, the enlarged angle δ of the fan-shaped laser beams 3a, 3b, and 3c has an area of ±10°, and the tracking light 4 is emitted in an area of ±1°. That is, an emitting area of the fan-shaped laser beams 3a, 3b, and 3c is wider than that of the tracking light 4, and an emitting area of the tracking light 4 is more than that of the distance-measuring light 5. The same one can be used for the distance-measuring light 5 and the tracking light 4.

Action of Surveying Instrument and Measured Object

Figure 6:
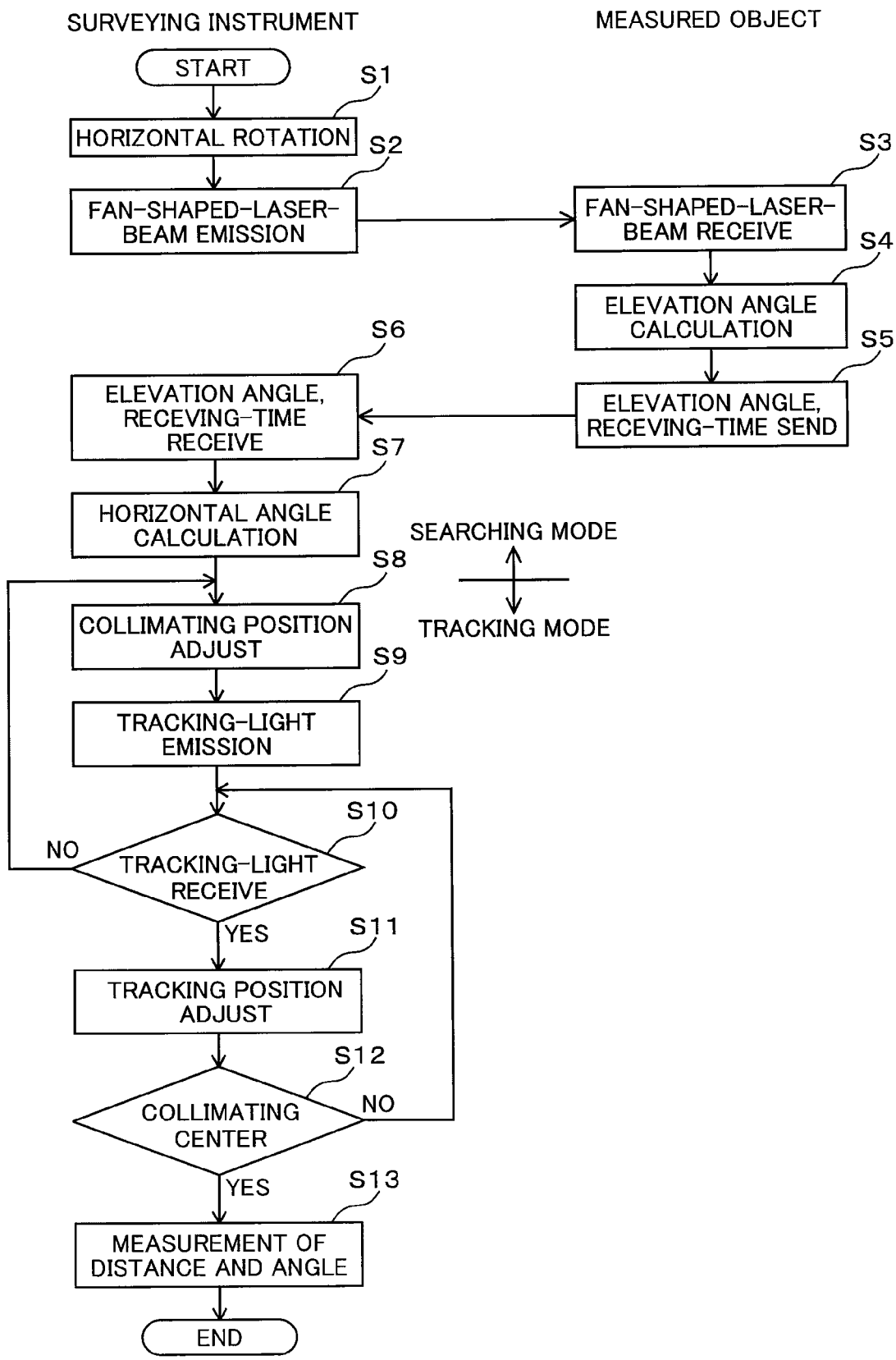
FIG. 6 is a flowchart in a first embodiment.

Action of the surveying instrument 1 and the measured object 2 will be described hereinafter. FIG. 6 is a flowchart in the first embodiment. A computer-readable program carrying out processes in FIG. 6 is stored in the memory section 61, and is carried out by the control arithmetic section 60. This computer-readable program can be provided by storing it in such a recording medium as a CDROM.

First, the surveying instrument 1 changes to a searching mode for searching for a direction of the measured object 2. The surveying instrument 1 drives the horizontal rotary motor 15, and horizontally rotates the main body 10 of the surveying instrument 1 (Step 1), and emits the fan-shaped laser beams 3a, 3b, and 3c from the fan-shaped-laser-beam-emitting section 13 while rotating (Step 2). At this time, the surveying instrument 1 detects a horizontal angle in a predetermined time interval by the horizontal encoder 16, and stores this in a memory section 61.

The measured object 2 receives the fan-shaped laser beams 3a, 3b, and 3c in the fan-shaped-laser-beam-receiving section 6 (Step 3). At this time, if the number of light signals is less than the number of the fan-shaped laser beams 3a, 3b, and 3c, the surveying instrument 1 judges its cause to be shortage of light quantities, and it raises the light-receiving sensitivity. If the number of light signals is more than the number of the fan-shaped laser beams 3a, 3b, and 3c, the surveying instrument 1 judges its cause to be the existence of an unnecessary reflector, and lowers the light-receiving sensitivity. Next, the control arithmetic section 62 of the measured object 2 calculates an elevation angle between the surveying instrument 1 and the measured object 2 from light signals 70a, 70b, and 70c of the fan-shaped laser beams 3a, 3b, and 3c (Step 4). The elevation angle and the receiving time of light signals 70a, 70b, and 70c are sent to the surveying instrument 1 by the wireless communication section 63 (Step 5). Like the above-mentioned, the measured object 2 does not calculate the elevation angle, and can send only the receiving time of light signals 70a, 70b, and 70c to the surveying instrument 1. In addition, the measured object 2 sends only the receiving notification to the surveying instrument 1, and then calculates the elevation angle and can send this to the surveying instrument 1.

When the surveying instrument 1 cannot receive the elevation angle and the receiving time from the measured object 2, that is, when the surveying instrument 1 cannot detect the measured object 2 by using the fan-shaped laser beams 3a, 3b, and 3c, the surveying instrument 1 changes the emitting direction of the fan-shaped laser beams 3a, 3b, and 3c to a vertical rotary direction. On the other hand, when the surveying instrument 1 receives the elevation angle and the receiving time (Step 6), the surveying instrument 1 calculates a horizontal angle from the receiving time (Step 7).

Then, the surveying instrument 1 drives the vertical rotary motor 18 and the horizontal rotary motor 15, and adjusts the collimating position (Step 8). After the collimation has finished, the surveying instrument 1 changes to a tracking mode for tracking the measured object 2. The surveying instrument 1 emits the tracking light 4 from the tracking-light-emitting section 42 (Step 9). The tracking light 4 is reflected by the corner cube 7 of the measured object 2, and the surveying instrument 1 judges whether the tracking light 4 can be received (Step 10). When the tracking-light-receiving section 43 cannot receive the tracking light 4 (No in Step 10), that is, when the measured object 2 is outside in the collimating range, the surveying instrument 1 adjusts again the collimating position by rotating in a vertical direction (Step 8) and emits again the tracking light 4 (Step 9), because the output direction of the fan-shaped laser beams 3a, 3b, and 3c and the output direction of the tracking light 4 and the distance-measuring light 5 are the same in horizontal plane.

When the tracking-light-receiving section 43 could receive the tracking light 4 (Yes in Step 10), the surveying instrument 1 adjusts a tracking position (Step 11). The tracking position is so adjusted that a barycentric position of the tracking light 4 which the tracking-light-receiving section 43 received is a center position (a collimating center) of a light-detecting element in the tracking-light-receiving section 43 (Step 12). When the barycentric position of the tracking light 4 is the collimating center (Yes in Step 12), the surveying instrument 1 measures a distance and an angle to the measured object 2

(Step 13). When the barycentric position of the tracking light 4 is not the collimating center (No in Step 12), flow of processing returns to Step 10.

Advantages of the First Embodiment

According to the first embodiment, because a search area of the fan-shaped laser beams 3a, 3b, and 3c is wide, the fan-shaped laser beam can shorten the search time of the measured object 2. The surveying instrument 1 can collimate approximately by using these fan-shaped laser beams 3a, 3b, and 3c. The surveying instrument 1 can collimate precisely by using the tracking light 4 of parallel light.

In addition, according to the first embodiment, the measured object 2 can receive the fan-shaped laser beams 3a, 3b, and 3c, and can calculate a direction of the measured object 2.

Furthermore, even if the measured object 2 is not in the search area of the fan-shaped laser beams 3a, 3b, and 3c, the measured object 2 can be searched quickly by changing an emitting direction to a vertical plane. In addition, the measured object 2 can be searched for by the fan-shaped laser beams 3a, 3b, and 3c, and even if the measured object 2 is not in the collimating range of the tracking light 4, the measured object 2 can be collimated by driving in a vertical direction.

2. Second Embodiment

An example of a surveying instrument and a surveying system comprising a fan-shaped-laser-beam-emitting section and a fan-shaped-laser-beam-receiving section will be described hereinafter. The composition that are similar to those in the first embodiment are omitted.

Composition of Surveying Instrument and Measured Object

Figure 7:
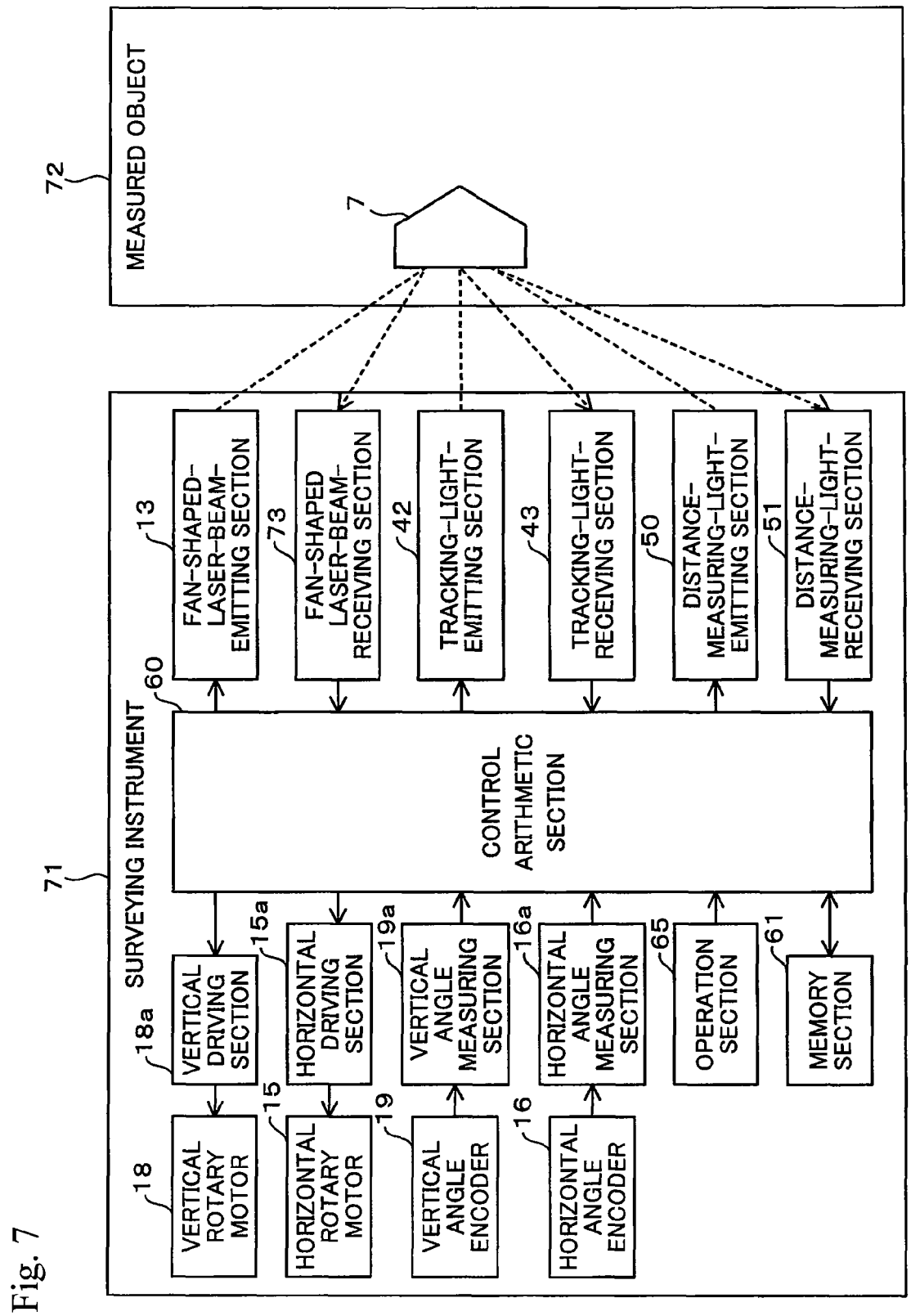
FIG. 7 is a block diagram of a surveying instrument and a measured object in a second embodiment.
Figure 8:
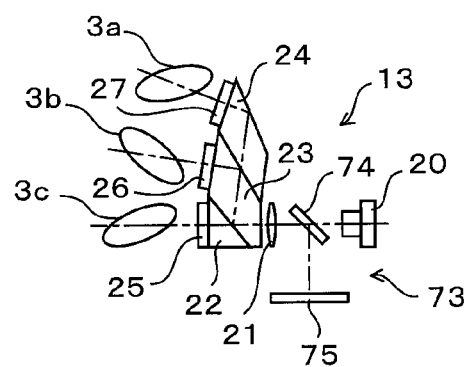
FIG. 8 is a diagram showing an optical system of a fan-shaped-laser-beam-emitting section and of a fan-shaped-laser-beam-receiving section.

FIG. 7 is a block diagram of a surveying instrument and a measured object in the second embodiment, and FIG. 8 is a diagram showing an optical system of a fan-shaped-laser-beam-emitting section and of a fan-shaped-laser-beam-receiving section. As shown in FIG. 7, the surveying instrument 71 has a fan-shaped-laser-beam-receiving section 73, and the measured object 72 has only the corner cube 7. As shown in FIG. 8, the fan-shaped-laser-beam-receiving section 73 further has an aperture mirror 74 and a light-detecting element 75 between a fan-shaped laser light source 20 and a relay lens 21.

When the fan-shaped-laser-beam-receiving section 73 receives the fan-shaped laser beams 3a, 3b, and 3c, the control arithmetic section 60 of the surveying instrument 71 calculates a horizontal angle by the receiving time of the fan-shaped laser beams 3a, 3b, and 3c and a value detected by the horizontal angle encoder 16. In addition, the control arithmetic section 60 of the surveying instrument 71 calculates an elevation angle by time interval ratio of light signals 70a, 70b, and 70c of the fan-shaped laser beams 3a, 3b, and 3c. In particular, when a distance between the surveying instrument 71 and the measured object 72 is short, the elevation angle calculated by the control arithmetic section 60 has the following positional offset.

Figure 9:
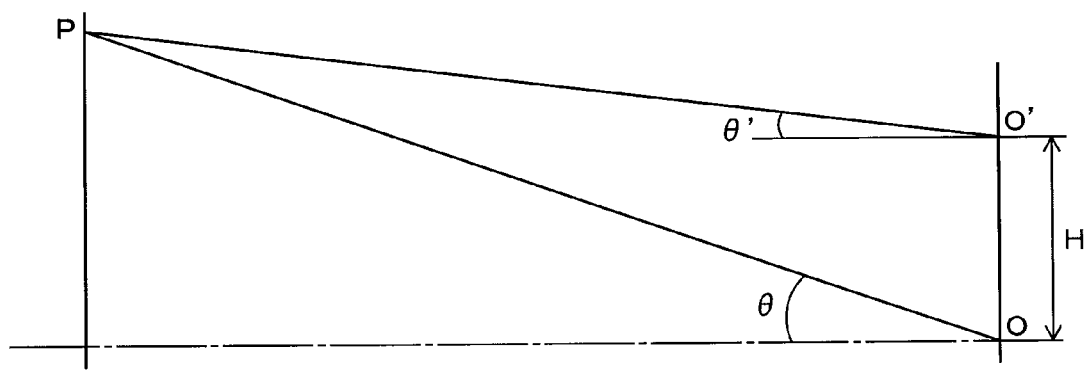
FIG. 9 is an explanatory diagram of a positional offset between fan-shaped laser beams and a tracking light or a distance-measuring light.

The positional offset between the fan-shaped laser beams 3a, 3b, and 3c and the tracking light 4 or the distance-measuring light 5 will be described hereinafter. FIG. 9 is an explanatory diagram of a positional offset between the fan-shaped laser beams and the tracking light 4 or the distance-measuring light 5. O is a collimating position of a telescope section, O' is an output position of the fan-shaped laser beams 3a, 3b, and 3c, P is a position of the corner cube 7 in the measured object 72. In the surveying instrument 71, an optical path of the fan-shaped laser beams 3a, 3b, and 3c is different from an optical path of a tracking light 4 or a distance-measuring light 5, so a positional offset exists.

In the case of FIG. 9, a relationship between an elevation angle θ', which is detected by the fan-shaped laser beams 3a, 3b, and 3c, and a vertical angle θ in an actual collimating position, is θ>θ'. When a distance between the surveying instrument 71 and the measured object 72 is short, an influence of an angle offset is larger. Therefore, use in a permissible range is preferable. For example, when a positional offset H is 300 mm, and when a difference (an angle offset) between an elevation angle θ', which is detected by the fan-shaped laser beams 3a, 3b, and 3c, and a vertical angle θ in a actual collimating position, is about 1°, and a distance is about 20 m. At such a distance, a surveyor can easily distinguish the influence level. This angle offset can be corrected by setting it to surveying instrument 71 beforehand according to the following procedures. In addition, an angle offset can be stored in the memory section 61 of the surveying instrument 71 in advance as a constant.

(1) The measured object 72 is set at a suitable distance.

(2) The corner cube 7 of the measured object 72 is collimated by using the telescope section 30, and a vertical angle and a horizontal angle is measured.

(3) An elevation angle and a horizontal angle to the measured object 72 is detected by the fan-shaped laser beams 3a, 3b, and 3c.

(4) An angle offset between the elevation angle and the vertical angle is stored, and an elevation angle which is actually detected by the fan-shaped laser beams 3a, 3b, and 3c is corrected by the angle offset.

On the other hand, an outputting direction of the fan-shaped laser beams 3a, 3b, and 3c and an outputting direction of the tracking light 4 or the distance-measuring light 5 are the same. In addition, the fan-shaped-laser-beam-emitting section 13 and the mirror cylinder 12 emitting the tracking light 4 or the distance-measuring light 5 rotate horizontally around the same vertical axis, and the same horizontal angle encoder 16 detects the horizontal angle. Therefore, there is not a horizontal angle offset between the fan-shaped laser beams 3a, 3b, and 3c and the tracking light 4 or the distance-measuring light 5. When a direction of the measured object 72 is detected by the fan-shaped laser beams 3a, 3b, and 3c, even if the measured object 72 is outside in a collimating range, the direction of the measured object 72 is limited in a vertical direction. Therefore, in comparison with a case in which there are two angle offsets of a vertical angle and a horizontal angle, the surveying instrument 71 can quickly detect the direction of the measured object 72.

When there is a horizontal angle offset between the fan-shaped laser beams 3a, 3b, and 3c and the tracking light 4 or the distance-measuring light 5, for example, when an outputting direction of the fan-shaped laser beams 3a, 3b, and 3c and an outputting direction of the tracking light 4 or the distance-measuring light 5 are opposite, a horizontal angle which is detected by the fan-shaped laser beams 3a, 3b, and 3c can be corrected by storing the angle offset in the memory section 61 in advance. In addition, a horizontal angle offset can be calculated by the above-mentioned procedures.

Action of Surveying Instrument and Measured Object

Figure 10:
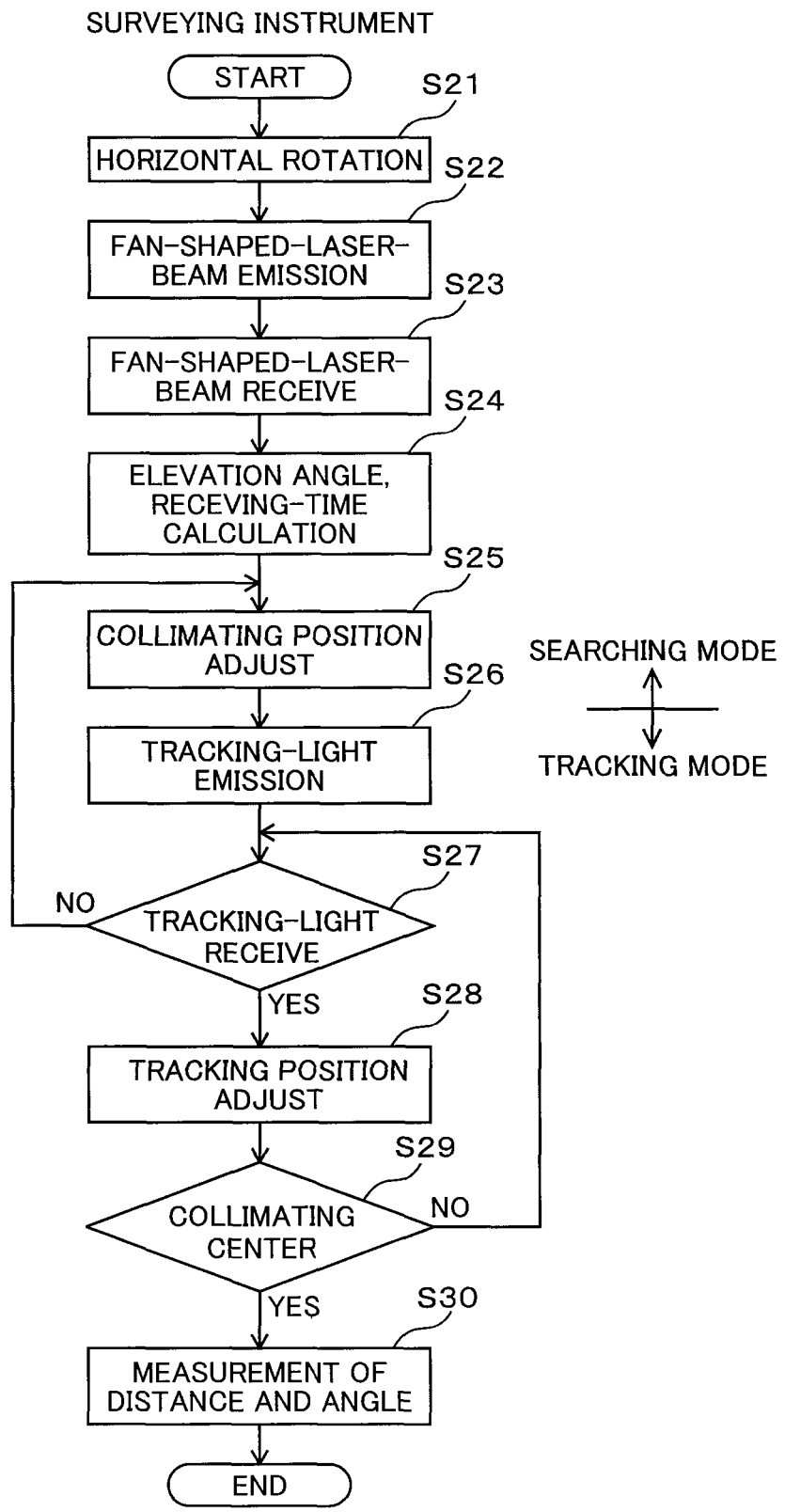
FIG. 10 is a flowchart in a second embodiment.

Action of the surveying instrument 71 and the measured object 72 will be described hereinafter. FIG. 10 is a flowchart in the second embodiment. A computer-readable program carrying out processes in FIG. 10 is stored in the memory section 61 in the surveying instrument 71, and is carried out by the control arithmetic section 60. This computer-readable program can be provided by storing it in such a recording medium as a CDROM.

First, the surveying instrument 71 changes to a searching mode for searching the direction of the measured object 72. The surveying instrument 71 drives the horizontal rotary motor 15, and rotates horizontally the main body 10 (Step 21), and emits the fan-shaped laser beams 3a, 3b, and 3c from the fan-shaped-laser-beam-emitting section 13 while rotating (Step 22). At this time, the surveying instrument 71 detects a horizontal angle by the horizontal encoder 16 in a predetermined time interval, and stores this in a memory section 61.

Then, the fan-shaped-laser-beam-receiving section 70 receives the fan-shaped laser beams 3a, 3b, and 3c which is reflected by the corner cube 7 of the measured object 72 (Step 23). At this time, if number of light signals is less than number of the fan-shaped laser beams 3a, 3b, and 3c, the surveying instrument 71 judges its cause shortage of light quantities, and raises the light-receiving sensitivity. If the number of light signals is more than the number of the fan-shaped laser beams 3a, 3b, and 3c, the surveying instrument 71 judges its cause to be the existence of an unnecessary reflector, and lowers the light-receiving sensitivity. In addition, when the fan-shaped-laser-beam-receiving section 70 cannot receive the fan-shaped laser beams 3a, 3b, and 3c, the surveying instrument 71 can emit while rotating in a vertical direction in which a positional offset exists.

Next, the control arithmetic section 60 of the surveying instrument 71 calculates an elevation angle between the surveying instrument 71 and the measured object 72 by light signals of the fan-shaped laser beams 3a, 3b, and 3c, and calculates a horizontal angle by the receiving time of the fan-shaped laser beams 3a, 3b, and 3c and the horizontal angle encoder 16 (Step 24). Then, the surveying instrument 71 drives the vertical rotary motor 18 and the horizontal rotary motor 15, and adjusts the collimating position (Step 25).

After the collimation has finished, the surveying instrument 71 changes to a tracking mode for tracking the measured object 72. The surveying instrument 71 emits the tracking light 4 from the tracking-light-emitting section 42 (Step 26). The tracking light 4 is reflected by the corner cube 7 of the measured object 72, and the surveying instrument 71 judges whether the tracking light 4 can be received (Step 27). When the tracking-light-receiving section 43 cannot receive the tracking light 4 (No in Step 27), that is, when the measured object 2 is outside the collimating range, the surveying instrument 71 adjusts again the collimating position by rotating in a vertical direction (Step 25) and emits again the tracking light 4 (Step 26), because the output direction of the fan-shaped laser beams 3a, 3b, and 3c and the output direction of the tracking light 4 and the distance-measuring light 5 are the same in horizontal plane. When the tracking-light-receiving section 43 cannot receive the tracking light 4, there is a possibility that the surveying instrument 71 cannot detect the approximate direction of the measured object 72 due to the influences such as the ambient light. Therefore, the surveying instrument 71 can search again for the measured object 72 by the fan-shaped laser beams 3a, 3b, and 3c.

When the tracking-light-receiving section 43 could receive the tracking light 4 (Yes in Step 27), the surveying instrument 71 adjusts a tracking position (Step 28). The tracking position is so adjusted that a barycentric position of the tracking light 4 which the tracking-light-receiving section 43 received is a center position (a collimating center) of a light-detecting element in the tracking-light-receiving section 43 (Step 29). When the barycentric position of the tracking light 4 is the collimating center (Yes in Step 29), the surveying instrument 71 measures a distance and an angle to the measured object 72 (Step 30). When the barycentric position of the tracking light 4 is not the collimating center (No in Step 29), flow of processing returns to Step 27. Advantages of the second embodiment According to the second embodiment, the measured object 72 can have only a reflector (corner cube 7). In addition, the surveying instrument 71 can calculate the direction of the measured object 72.

Industrial Applicability

The present invention can be used in a surveying instrument for measuring a distance and an angle to a measured object by tracking a reflector provided at the measured object.

What is claimed is:

1. A surveying instrument for measuring three-dimensional position of a measured object, comprising:
a detecting section for detecting a direction of the measured object by rotational emission of two or more fan-shaped laser beams in which at least one beam is inclined;
an optical system including a tracking-light-emitting section for emitting a tracking light and a distance-measuring-light-emitting section for emitting a distance-measuring light;
a tracking-light-receiving section for receiving the tracking light reflected by the measured object; and
a driving section for driving the optical system in order to collimate the measured object according to an output of the detecting section and an output of the tracking-light-receiving section.

2. A surveying system including a surveying instrument for measuring a three-dimensional position of a measured object, comprising:
a detecting section for detecting a direction of the measured object by rotational emission of two or more fan-shaped laser beams in which at least one beam is inclined;
an optical system including a tracking-light-emitting section for emitting a tracking light and a distance-measuring-light-emitting section for emitting a distance-measuring light;
a tracking-light-receiving section for receiving the tracking light reflected by the measured object; and
a driving section for driving the optical system in order to collimate the measured object according to an output of the detecting section and an output of the tracking-light-receiving section.

3. The surveying system according to claim 2, wherein the measured object is a target having a reflector,
the detecting section has a fan-shaped-laser-beam-receiving section for receiving the fan-shaped laser beams reflected by the reflector, and
the direction of the measured object is detected based on a rotating position of the beam emission and receiving signals of the fan-shaped-laser-beam-receiving section.

4. The surveying system according to claim 2, wherein the measured object is a target having a fan-shaped-laser-beam-receiving section, and
the detecting section has a wireless communication section for communicating by the wireless between the surveying instrument and the measured object, and a calculating section for calculating a direction of the measured object according to the direction of the rotational emission of the fan-shaped laser beams in a horizontal plane and according to receiving-signals of the fan-shaped-laser-beam-receiving section obtained by the wireless communication section.

5. The surveying system according to claim 4, wherein the calculating section is provided at the measured object.

6. The surveying system according to claim 5, wherein the calculating section is provided at the surveying instrument.

7. The surveying instrument according to claim 1, wherein the rotational emission of the fan-shaped laser beams is carried out by a fan-shaped-laser-beam-emitting section, and
the fan-shaped-laser-beam-emitting section and the optical system rotates around the same vertical axis.

8. The surveying instrument according to claim 1, wherein the fan-shaped-laser-beam-emitting section can rotate in a vertical plane, and
when the detecting section cannot detect a direction of target, the direction of the rotational emission in a vertical plane is changed.

9. The surveying instrument according to claims 1, wherein when the driving section drives the optical system according to the output of the detecting section and the collimating by the output of the tracking-light-receiving section is not possible, the driving section drives the optical system in a vertical direction.

10. A method for detecting a measured object by a surveying instrument that measures a three-dimensional position of the measured object, comprising:
a first step for detecting a direction of the measured object by rotational emission of two or more fan-shaped laser beams in which at least one beam is inclined;
a second step for driving an optical system including a tracking-light-emitting section and a distance-measuring-light-emitting section in the direction of the measured object according to an output of the first step;
a third step for driving the driving section according to relative position between an optical axis in the fan-shaped-laser-beam-emitting section and an optical axis in the optical system, when a tracking light is emitted in a direction of the measured object and a tracking-light-receiving section cannot receive the tracking light reflected by the measured object; and
a fourth step for emitting the tracking light in a direction of the measured object, for receiving the tracking light reflected at the measured object by the tracking-light-receiving section, and for driving the driving section.

11. A computer-readable recording medium for detecting a measured object by a surveying instrument that measures a three-dimensional position of the measured object, comprising:
a first step for detecting a direction of the measured object by rotational emission of two or more fan-shaped laser beams in which at least one beam inclines;
a second step for driving an optical system including a tracking-light-emitting section and a distance-measuring-light-emitting section in the direction of the measured object according to an output of the first step;
a third step for driving the driving section according to relative position between an optical axis in the fan-shaped-laser-beam-emitting section and an optical axis in the optical system, when a tracking light is emitted in a direction of the measured object and a tracking-light-receiving section cannot receive the tracking light reflected by the measured object; and
a fourth step for emitting the tracking light in a direction of the measured object, for receiving the tracking light reflected at the measured object by the tracking-light-receiving section, and for driving the driving section.

* * * * *